UNITED STATES PATENT OFFICE.

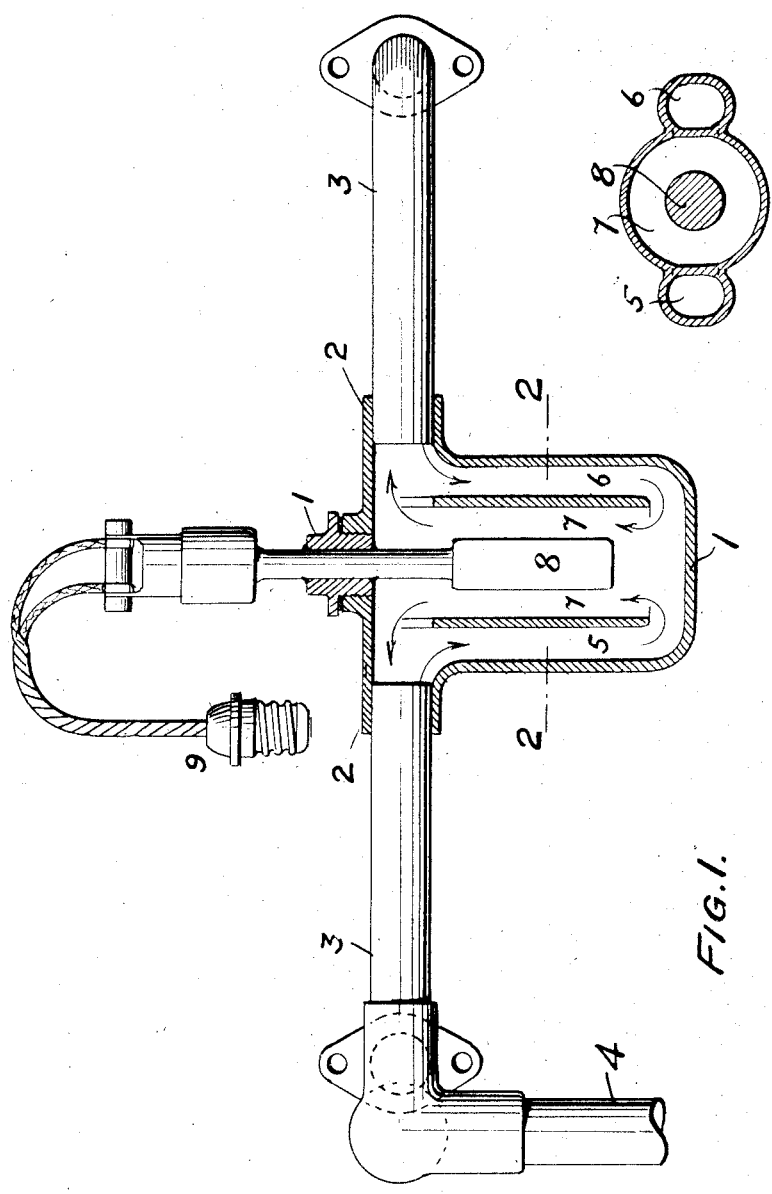

MARTIN C. FURSTENAU, OF PHILADELPHIA, PENNSYLVANIA.

PROTECTION OF AUTOMOBILE POWER-PLANTS FROM COLD.

1,359,049.  Specification of Letters Patent.  Patented Nov. 16, 1920.

Application filed March 25, 1919. Serial No. 284,997.

*To all whom it may concern:*

Be it known that I, MARTIN C. FURSTENAU, a citizen of the United States, residing at the city of Philadelphia, in the county of Philadelphia and State of Pennsylvania, have invented certain new and useful Improvements in the Protection of Automobile Power Plants from Cold, of which the following is a specification.

The principal object of the present invention is to provide a simple, efficient, reliable and comparatively inexpensive electric heating apparatus capable of easy permanent incorporation in, or detachable connection with the circulating system of an automobile power plant, and adapted for attachment to any ordinary electric light socket.

The invention will be claimed at the end hereof but will be first described in connection with the embodiment of it chosen for illustration in the accompanying drawings forming part hereof and in which—

Figure 1, is a side view, partly in section, of apparatus embodying features of the invention and adapted for permanent attachment to a car.

Fig. 2, is a section on the line 2—2, of Fig. 1, and

Figure 3:
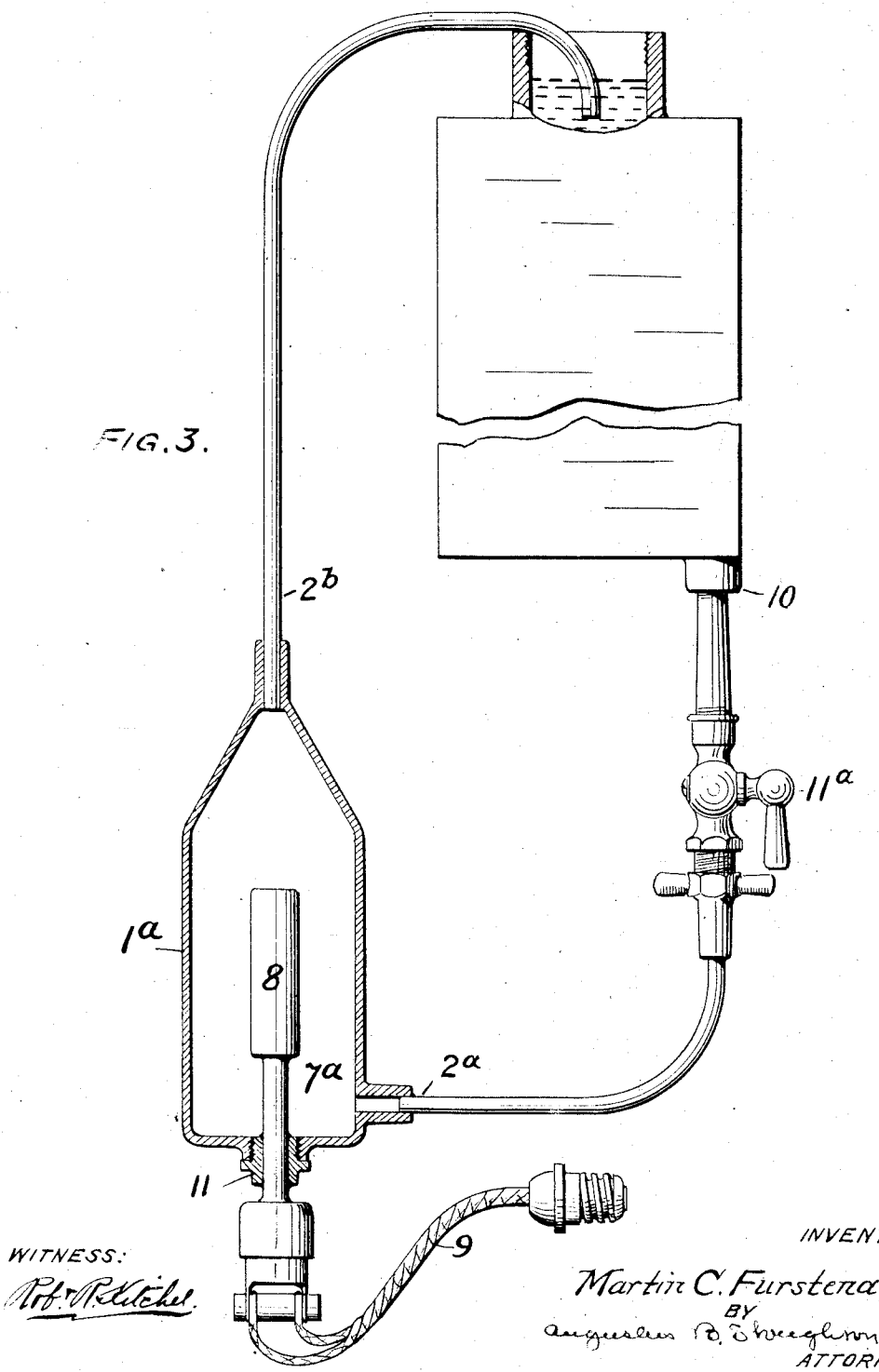
Fig. 3, is a side view, partly in section of apparatus embodying a modification of the invention and adapted for removable attachment to a car.

Referring to the drawings and more particularly to Fig. 1, 1, is an enlarged casing having pipe connections 2, for including the casing in the cooling fluid circulating system of the power plants. In other words, the casing 1, is included in the pipes 3, that lead to the cylinder jackets and of which one is connected as by a branch pipe 4, with the pump. The casing 1, has two lobe chambers 5 and 6, which communicate with it at the top and bottom and provide a fluid way 7. 8, is a hot point projecting into the casing and disposed lengthwise of its fluid way 7. A hot point is a well understood piece of electrical apparatus which by resistance to the passage of current through it becomes hot and will impart its heat to water or fluid in which it can safely be immersed. 9, is a flexible electric conductor attached to the hot point 8, and adapted for connection to any socket of a source of current. The arrows indicate the descending flow of the cooler fluid and the ascending flow of the hotter fluid heated by the hot point 8, in the circulating system.

In Fig. 3, 1ª, is the enlarged casing having pipe connections 2ª and 2ᵇ, for including the casing in the cooling fluid circulation of an automobile power plant. The pipe connection 2ᵇ, hooks into the filling opening of the radiator and dips into the fluid, and the pipe connection 2ª, is detachably connected to the lowest part of the circulation system, for example, to the radiator drain 10, which is fitted with a valve 11ª, closed when the pipe connection 2ª, is detached. The hot point 8, projects into the casing 1ª, and is disposed lengthwise of its fluid way 7ª. 9, is the socket connection attached to the hot point. The circulation induced by the hot point is from the lower to the upper portion of the casing 2ª. The screw bushing 11, may be split into parts in order to apply it to the stem of the hot point, and the parts brazed or soldered together after application to the stem. The bushing can then be screwed into the tapped opening in the wall of the casing through which the hot point has been inserted.

The device above described may be readily attached to any power plant circulation system and when connected to a source of electric supply will keep the water in the system from freezing, even in severe weather.

I claim:

1. Heating apparatus for automobile power plants comprising the combination of an enlarged casing having pipe connections for including the casing in series in the cooling fluid circulation system of the power plant, a hot-point projecting through the casing and disposed lengthwise of its fluid way and clear of its walls, and a socket connection attached to the hot-point, substantially as described.

2. In heating apparatus for automobile power plants the combination of an enlarged casing, a hot-point projecting through the casing and clear of its walls, and a split and soldered bushing applied to the shank of the hot-point and adapted to engage a threaded opening in series in the wall of the casing, substantially as described.

3. Heating apparatus for automobile power plants comprising the combination of an enlarged casing having lobe chambers communicating with it at the top and providing a fluid way, pipe connections for including the casing in the cooling fluid circulation system of the power plant, a hot point projecting into the casing and disposed lengthwise of its fluid way, and a socket connection attached to the hot-point, substantially as described.

MARTIN C. FURSTENAU.